United States Patent
Kim et al.

(10) Patent No.: US 11,580,741 B2
(45) Date of Patent: Feb. 14, 2023

(54) METHOD AND APPARATUS FOR DETECTING ABNORMAL OBJECTS IN VIDEO

(71) Applicant: INDUSTRY ACADEMY COOPERATION FOUNDATION OF SEJONG UNIVERSITY, Seoul (KR)

(72) Inventors: Yong Guk Kim, Seongnam-si (KR); Long Thinh Nguyen, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 253 days.

(21) Appl. No.: 17/133,784

(22) Filed: Dec. 24, 2020

(65) Prior Publication Data

US 2021/0201042 A1 Jul. 1, 2021

(30) Foreign Application Priority Data

Dec. 30, 2019 (KR) .......................... 10-2019-0177627
Dec. 11, 2020 (KR) .......................... 10-2020-0172912

(51) Int. Cl.
*G06V 20/40* (2022.01)
*G06N 3/08* (2006.01)
(Continued)

(52) U.S. Cl.
CPC ............... *G06V 20/46* (2022.01); *G06N 3/08* (2013.01); *G06T 5/005* (2013.01); *G06V 20/64* (2022.01)

(58) Field of Classification Search
CPC ...... G06N 3/0445; G06N 3/0454; G06N 3/08; G06K 9/627; G06T 2207/10016; G06T 2207/20084; G06T 5/005; G06T 7/0002; G06V 10/764; G06V 10/82; G06V 20/46; G06V 20/52; G06V 20/64
See application file for complete search history.

(56) References Cited

U.S. PATENT DOCUMENTS

| | | | |
|---|---|---|---|
| 2007/0122040 A1* | 5/2007 | Au ........................ | G06V 10/40 382/190 |
| 2010/0207762 A1* | 8/2010 | Lee ........................ | G06V 20/52 340/541 |

(Continued)

OTHER PUBLICATIONS

Joey Tianyi Zhou,"Attention-Driven Loss for Anomaly Detection in Video Surveillance," Dec. 25, 2019, IEEE Transactions on Circuits and Systems for Video Technology ( vol. 30, Issue: 12, Dec. 2020),pp. 4639-4644.*

(Continued)

*Primary Examiner* — Omar S Ismail (57) ABSTRACT

Disclosed are a method and an apparatus for detecting abnormal objects in a video. The method for detecting abnormal objects in a video reconstructs a restored batch by applying each input batch to which an inpainting pattern is applied to a trained auto-encoder model, and fuses a time domain reconstruction error using time domain restored frames output by extracting and restoring a time domain feature point by applying a spatial domain reconstruction error and a plurality of successive frames using a restored frame output by combining the reconstructed restoring batch to a trained LSTM auto-encoder model to estimate an area where an abnormal object is positioned.

10 Claims, 9 Drawing Sheets

(51) Int. Cl.
  *G06V 20/64* (2022.01)
  *G06T 5/00* (2006.01)

(56) References Cited

U.S. PATENT DOCUMENTS

| | | | | |
|---|---|---|---|---|
| 2011/0081043 | A1* | 4/2011 | Sabol | G06T 7/254 |
| | | | | 382/103 |
| 2014/0055610 | A1* | 2/2014 | Ko | G06T 7/11 |
| | | | | 348/143 |
| 2014/0201126 | A1* | 7/2014 | Zadeh | A61B 5/7221 |
| | | | | 706/52 |
| 2016/0132754 | A1* | 5/2016 | Akhbardeh | G06V 30/194 |
| | | | | 382/103 |
| 2016/0203696 | A1* | 7/2016 | Suzuki | G06F 17/18 |
| | | | | 73/170.31 |
| 2016/0350597 | A1* | 12/2016 | Bataller | G06T 15/205 |
| 2016/0358312 | A1* | 12/2016 | Kolb, V | G06T 5/003 |
| 2017/0255861 | A1* | 9/2017 | Hawkins | G06N 3/0454 |
| 2017/0286846 | A1* | 10/2017 | Hawkins | G06N 5/047 |
| 2018/0047173 | A1* | 2/2018 | Wang | G06T 7/62 |
| 2018/0204111 | A1* | 7/2018 | Zadeh | G06N 3/0436 |
| 2018/0342070 | A1* | 11/2018 | Chen | G06V 20/52 |
| 2020/0017117 | A1* | 1/2020 | Milton | H04W 4/44 |
| 2020/0097857 | A1* | 3/2020 | Hawkins | G06N 3/08 |
| 2020/0133269 | A1* | 4/2020 | Wang | G06N 3/0454 |
| 2020/0265273 | A1* | 8/2020 | Wei | G06K 9/6268 |
| 2020/0410322 | A1* | 12/2020 | Naphade | G06N 7/005 |

OTHER PUBLICATIONS

Ya-Liang Chang,"VORNet: Spatio-temporally Consistent Video Inpainting for Object Removal," Jun. 2019,Proceedings of the IEEE/CVF Conference on Computer Vision and Pattern Recognition (CVPR) Workshops, 2019,pp. 1-6.*

B. Ravi Kiran,"An Overview of Deep Learning Based Methods for Unsupervised and Semi-Supervised Anomaly Detection in Videos," Feb. 7, 2018, Journal of Imaging 2018, 4, 36;doi:10.3390/jimaging4020036,pp. 1-12.*

Jordan Henrio,"Anomaly Detection in Videos Recorded by Drones in a Surveillance Context," Jan. 17, 2019, 2018 IEEE International Conference on Systems, Man, and Cybernetics,pp. 2503-2506.*

Yiwei Lu,"Future Frame Prediction Using Convolutional VRNN for Anomaly Detection," Nov. 2019, 2019 16th IEEE International Conference on Advanced Video and Signal Based Surveillance (AVSS),pp. 1-6.*

* cited by examiner

| Conv. Auto. | | |
|---|---|---|
| Input | - | (160, 240, 1) |
| Conv.[6] | 128 fil, 7x7, st=4 | (20, 30, 64) |
| BN | - | (40, 60, 128) |
| Activation | ReLU | (t, 40, 60, 128) |
| Conv. | 64 fil, 5x5, st=2 | (20, 30, 64) |
| BN | - | (20, 30, 64) |
| Activation | ReLU | (20, 30, 64) |
| Conv. | 32 fil, 3x3, st=1 | (20, 30, 32) |
| BN | - | (t, 20, 30, 32) |
| Activation | ReLU | (t, 20, 30, 32) |
| Deconv.[7] | 64 fil, 3x3, st=2 | (40, 60, 64) |
| BN | - | (t, 40, 60, 64) |
| Activation | ReLU | (t, 40, 60, 64) |
| Deconv. | 1 fil, 11x11, st=4 | (160, 240, 1) |

FIG.4

| ConvLSTM Auto.[0] | Configuration | Output Shape |
|---|---|---|
| Input | - | (t, 160, 240, 1) |
| TDC[1] | 128 fil,[4] 11×11, st[5]=4 | (t, 40, 60, 128) |
| BN[2] | - | (t, 40, 60, 128) |
| Activation | ReLU | (t, 40, 60, 128) |
| ConvLSTM 1 | 64 fil, 3×3, st=1 | (t, 20, 30, 64) |
| ConvLSTM 2 | 48 fil, 3×3, st=1 | (t, 20, 30, 48) |
| ConvLSTM 3 | 32 fil, 3×3, st=1 | (t, 20, 30, 32) |
| ConvLSTM 4 | 16 fil, 3×3, st=1 | (t, 20, 30, 16) |
| ConvLSTM 5 | 64 fil, 3×3, st=1 | (t, 20, 30, 64) |
| TDD[3] | 64 fil, 5×5, st=2 | (t, 40, 60, 128) |
| BN | - | (t, 40, 60, 128) |
| Activation | ReLU | (t, 40, 60, 128) |
| TDD | 1 fil, 11×11, st=4 | (t, 160, 240, 1) |

| $\Psi_{vs}(X)$ | Peds1 appearance pixel AUC | Peds2 appearance pixel AUC |
|---|---|---|
| $vs_3$ | 92.0% | 91.7% |
| $vs_7$ | 91.0% | 89.36% |
| $vs_{10}$ | 89.2%% | 84.36% |
| $hs_3$ | 91.7% | 91.1% |
| $hs_7$ | 88.6% | 83.7% |
| $hs_{10}$ | 87.7% | 86.1% |

METHOD AND APPARATUS FOR DETECTING ABNORMAL OBJECTS IN VIDEO

CROSS-REFERENCE TO RELATED APPLICATION

This application claims under 35 U.S.C. § 119(a) the benefit of Korean Patent No. 10-2019-0177627, filed with the Korean Intellectual Property Office on Dec. 30, 2019, and Korean Patent Application No. 10-2020-0172912, filed with the Korean Intellectual Property Office on Dec. 11, 2020. The disclosures of the above applications are incorporated herein by reference in their entirety.

BACKGROUND

(a) Technical Field

The present disclosure relates to a method and an apparatus for detecting abnormal objects in a video.

(b) Background Art

Abnormal object detection is a task of recognizing an abnormal pattern that is not related to an expected motion, and abnormality detection in a video is to detect an abnormal motion or object that rarely appears in the entire video sequence. In other words, the abnormal object detection is to detect a series of motions different from a current situation. Thus, while one motion can be considered "normal" in a context, the motion can be considered "abnormal" in another context, which may vary depending on the context.

Recently, CCTV has been installed exponentially. Therefore, the manpower required to monitor and analyze all CCTV images is also increasing, but it is virtually impossible to accurately analyze all images.

SUMMARY OF THE DISCLOSURE

The present disclosure has been made in an effort to provide a method and an apparatus for detecting abnormal objects in a video.

The present disclosure has also been made in an effort to provide a method and an apparatus for detecting abnormal objects in a video, which are capable of increasing accuracy of abnormal object detection by using an inpainting technique.

An embodiment of the present disclosure provides an apparatus for detecting abnormal objects in a video.

According to an embodiment of the present disclosure, an apparatus for detecting abnormal objects may be provided, which includes: a batch unit generating an input batch by applying each of a plurality of inpainting patterns to a current frame of a video; a first prediction unit reconstructing a restored batch by applying each input batch to which the inpainting pattern is applied to a trained auto-encoder model and combining the reconstructed restored batch to output a restored frame; a second prediction unit extracting and then restoring a time domain feature point by applying a plurality of successive frames to an LSTM auto-encoder model to output time domain restored frames, in which the plurality of successive frames are a plurality of successive frames including the current frame; and an abnormal object detection unit deriving a spatial domain reconstruction error by using the restored frame and the current frame, deriving a time domain reconstruction error by using the successive frames and the time domain restored frame, and estimating an area whether an abnormal object is positioned by fusing the spatial domain reconstruction error and the time domain reconstruction error.

The auto-encoder model may be trained by using a normal frame to which the inpainting pattern is not applied.

The first prediction unit applies input batches to which the inpainting pattern is applied to the trained auto-encoder model to generate an abnormal feature vector for the inpainting pattern.

The abnormal object detection unit may estimate an area in which the spatial domain reconstruction error is high as an area where the abnormal object exists at the time of fusing with the time domain reconstruction error as the spatial domain reconstruction error increases by the abnormal feature vector.

The inpainting patterns may have different patterns including zero (0).

Another embodiment of the present disclosure provides a method for detecting abnormal objects in a video.

According to another embodiment of the present disclosure, a method for detecting abnormal objects may be provided, which includes: (a) generating an input batch by applying each of a plurality of inpainting patterns to a current frame of a video; (b) reconstructing a restored batch by applying each input batch to which the inpainting pattern is applied to a trained auto-encoder model and combining the reconstructed restored batch to output a restored frame; (c) extracting and then restoring a time domain feature point by applying a plurality of successive frames to an LSTM auto-encoder model to output time domain restored frames, wherein the plurality of successive frames are a plurality of successive frames including the current frame; and (d) deriving a spatial domain reconstruction error by using the restored frame and the current frame, deriving a time domain reconstruction error by using the successive frames and the time domain restored frame, and estimating an area whether an abnormal object is positioned by fusing the spatial domain reconstruction error and the time domain reconstruction error.

The method may further include: before step (a), training the auto-encoder model by using a normal frame to which the inpainting pattern is applied; and training the LSTM auto-encoder by using the successive frames.

In step (b), the input batches to which the inpainting pattern is applied are applied to the trained auto-encoder model to generate an abnormal feature vector for the inpainting pattern.

In step (d), an area in which the spatial domain reconstruction error is high may be estimated as an area where the abnormal object exists at the time of fusing with the time domain reconstruction error as the spatial domain reconstruction error increases by the abnormal feature vector.

According to an embodiment of the present disclosure, a method and an apparatus for detecting abnormal objects in a video are provided to increase a reconstruction error by using an inpainting technique at the time of predicting a spatial domain, thereby increasing accuracy of abnormal object detection through fusion with time domain feature points.

DETAILED DESCRIPTION

A singular form used in the present specification may include a plural form if there is no clearly opposite meaning in the context. In the present specification, a term such as "comprising" or "including" should not be interpreted as necessarily including all various components or various steps disclosed in the present specification, and it should be interpreted that some component or some steps among them may not be included or additional components or steps may be further included. In addition, terms including "part", "module", and the like disclosed in the specification mean a unit that processes at least one function or operation and this may be implemented by hardware or software or a combination of hardware and software.

Hereinafter, an embodiment of the present disclosure will be described in detail with reference to the accompanying drawings.

Figure 1:
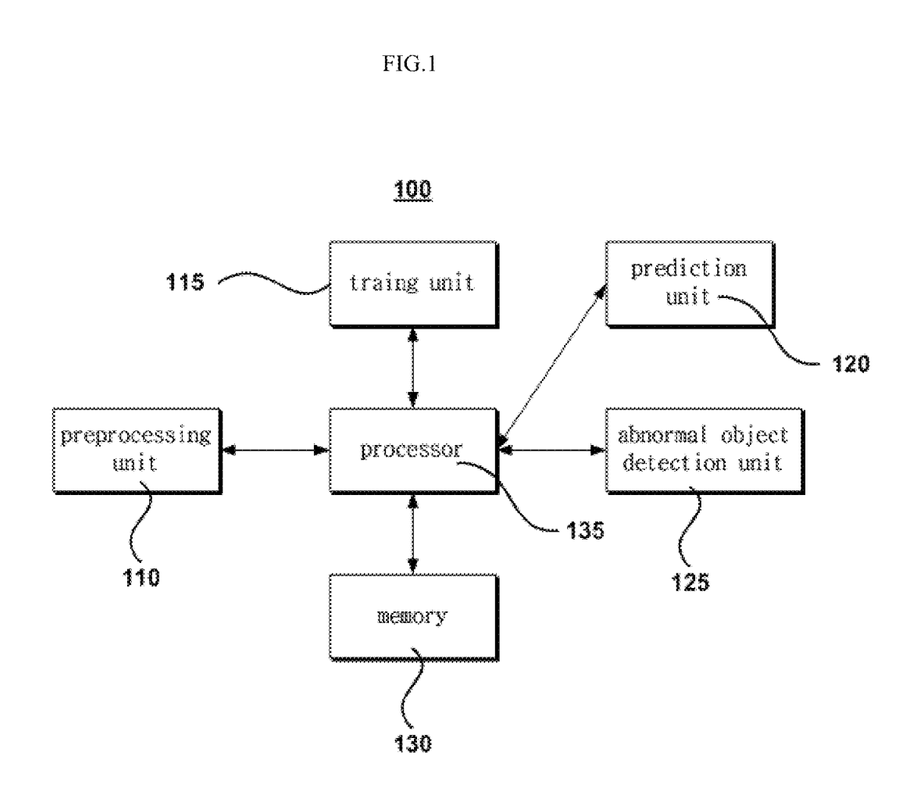
FIG. 1 is a block diagram schematically illustrating an internal configuration of an apparatus for detecting abnormal objects in a video according to an embodiment of the present disclosure.
Figure 2:
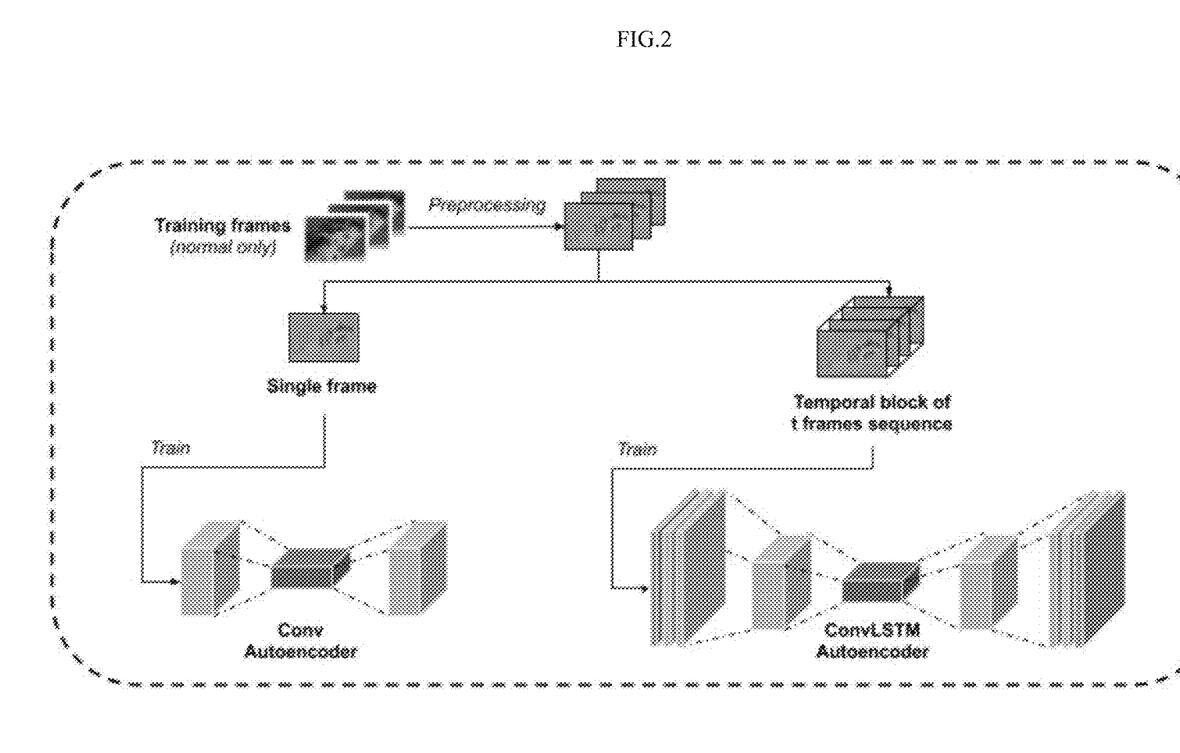
FIG. 2 is a diagram illustrating a training process of a model according to an embodiment of the present disclosure.
Figure 3:
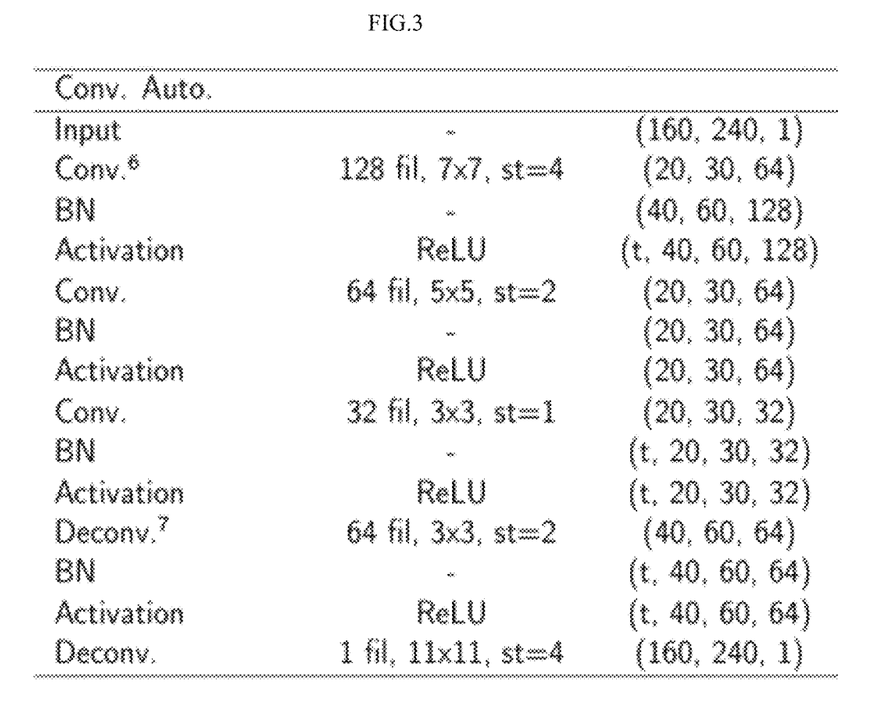
FIG. 3 is a diagram illustrating an architecture of an auto-encoder model according to an embodiment of the present disclosure.
Figure 4:
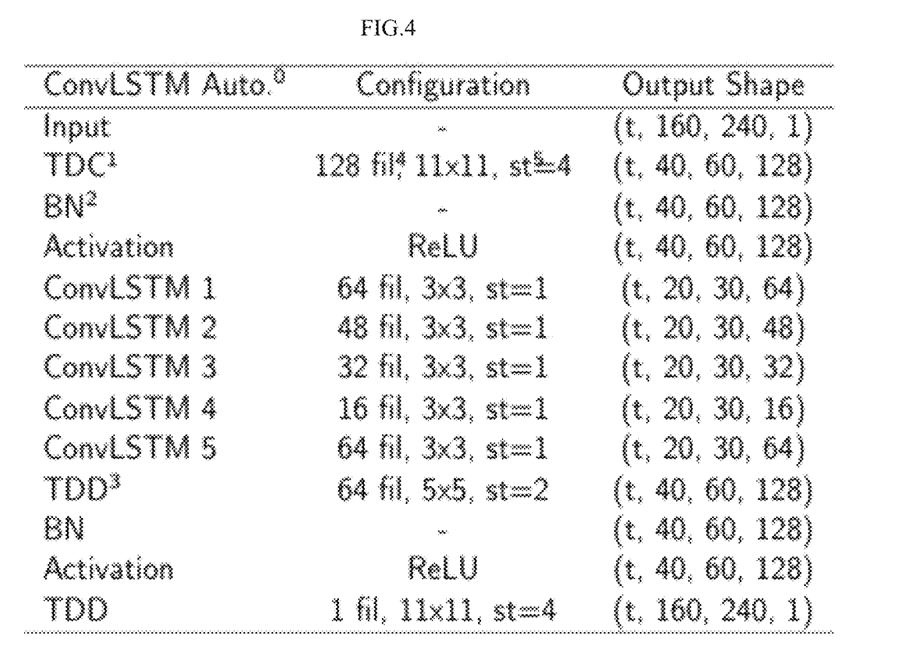
FIG. 4 is a diagram illustrating an architecture of an LSTM auto-encoder model according to an embodiment of the present disclosure.
Figure 5:
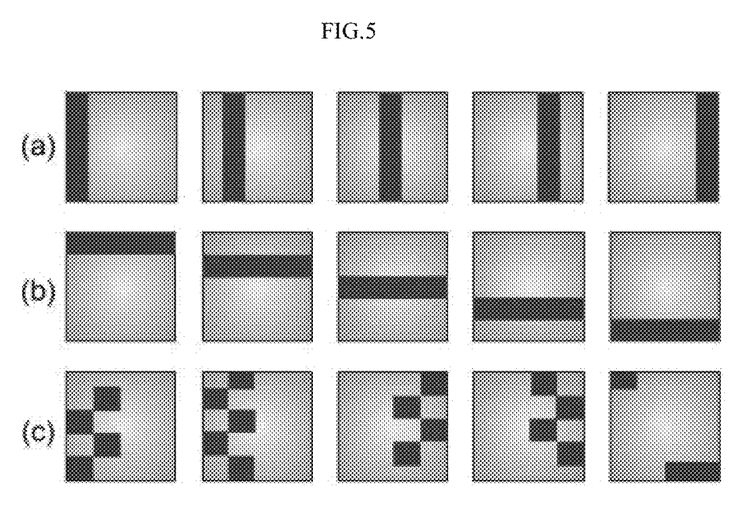
FIG. 5 is a diagram illustrating an inpainting pattern according to an embodiment of the present disclosure.
Figure 6:
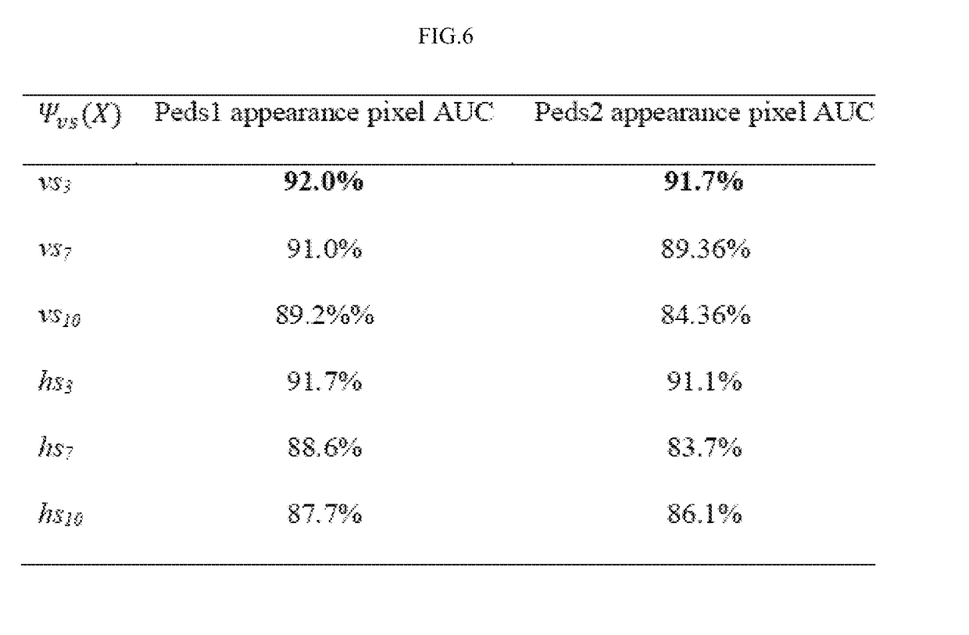
FIG. 6 is a diagram illustrating an abnormal object detection result depending on a width and a height of an inpainting pattern according to an embodiment of the present disclosure.

FIG. 1 is a block diagram schematically illustrating an internal configuration of an apparatus for detecting abnormal objects in a video according to an embodiment of the present disclosure, FIG. 2 is a diagram illustrating a training process of a model according to an embodiment of the present disclosure, FIG. 3 is a diagram illustrating an architecture of an auto-encoder model according to an embodiment of the present disclosure, FIG. 4 is a diagram illustrating an architecture of an LSTM auto-encoder model according to an embodiment of the present disclosure, FIG. 5 is a diagram illustrating an inpainting pattern according to an embodiment of the present disclosure, and FIG. 6 is a diagram illustrating an abnormal object detection result depending on a width and a height of an inpainting pattern according to an embodiment of the present disclosure.

Referring to FIG. 1, an apparatus 100 for detecting abnormal objects in a video according to an embodiment of the present disclosure is configured to include a preprocessing unit 110, a training unit 115, a prediction unit 120, an abnormal object detection unit 125, a memory 130, and a processor 135.

The preprocessing unit 110 is a means for preprocessing each frame of the video.

The training unit 115 is a means for training an auto-encoder model and an LSTM auto-encoder model by using the preprocessed frame.

The auto-encoder model is a means for training a spatial domain feature point by receiving each frame. The auto-encoder model may be a convolutional auto-encoder model including an encoder and a decoder.

The auto-encoder model may extract a spatial feature vector for an input frame at the encoder and restore (reconstruct) the frame by using the spatial feature vector at the decoder.

The auto-encoder model performs a process of generating a feature vector (latent vector) by reducing a dimension at the encoder and restoring the generated frame to be similar to the input frame by using at the decoder. During the training process, the auto-encoder model may repeatedly perform a process of adjusting a weight so that a difference between the input frame and the restored frame is minimized.

In the auto-encoder model, the encoder and the decoder may have a symmetrical structure. Accordingly, the auto-encoder model may generate a desired restored frame by using the feature vector generated by the encoder.

FIG. 2 illustrates the training process of the auto-encoder model. According to an embodiment of the present disclosure, training data may be trained by using frames which do not include abnormal objects during the training process. For example, the auto-encoder model may be the convolutional auto-encoder model. FIG. 3 illustrates the architecture of the auto-encoder model.

An encoder E of the auto-encoder model predicts a latent variable z for a given input X (frame) and a decoder D restores a signal from the latent variable. Accordingly, both the encoder E and the decoder D may be trained. A goal of training is to maximize accuracy of signal restoration and when expressed by other words, a reconstruction error is minimized. This is expressed as shown in Equation 1.

$$\min \xi(E,D) = \min |D(E(X))-X|^2 \quad \text{[Equation 1]}$$

The LSTM auto-encoder model includes a structure in which convolutional LSTM layers are stacked.

A Long Short-Term Memory (LSTM) neural network is proven to be a successful and robust model for remembering a correlation of temporal dependencies in real applications compared to standard RNNs or other variants. The convolutional LSTM as an extension of LSTM makes a matrix multiplication of the LSTM be suitable for the convolutional LSTM to process video data, then captures a spatiotemporal correlation well and surpasses the LSTM in some applications.

Activation of a convolutional LSTM cell at time t is given as below.

$$i_t = \sigma(w_{xi} \otimes x_t + w_{hi} \otimes h_{t-1} + b_i)$$

$$f_t = \sigma(w_{xf} \otimes x_t + w_{hf} \otimes h_{t-1} + b_f)$$

$$o_t = \sigma(w_{xo} \otimes x_t + w_{ho} \otimes h_{t-1} + b_o)$$

$$c_t = f_t \cdot c_{t-1} + i_t \cdot \tanh(w_{xc} \otimes x_t + w_{hc} \otimes h_{t-1} + b_c)$$

$$h_t = o_t \cdot \tanh(c_t)$$

Here, $x_t$ represents an input at time t, $i_t$, $f_t$, and $o_t$ represent an input gate, a forgetting gate, and an output gate. Further, $c_t$, $c_{t-1}$, $h_t$ and $h_{t-1}$ represent a memory and output activation at time t and time (t−1). σ and tanh represent sigmoid and non-linear hyperbolic tangent. For an input feature map having a size of D×h×w, the convolutional LSTM model may output a memory map having a size of $d_m \times h \times w$. Here, $d_m$ represents the number of temporal features trained by the memory. The LSTM auto-encoder model according to an embodiment of the present disclosure is designed in a structure in which a plurality of convolutional LSTM layers are stacked in order to use an advantage of the convolutional LSTM.

According to an embodiment of the present disclosure, input and repeated transform of the LSTM auto-encoder model is 2-dimensional convolutional transform instead of a general linear transform used in the Long Short-Term Memory (LSTM) requiring a multiplication of a weight matrix for the input and a state. The LSTM auto-encoder model may be designed to interpret visual information in the form of a 2D image and understand sequential data (sequence). A batch normalization layer may be added after the LSTM layer. The batch normalization layer may change a distribution of the input so as to have an average of 0 and a distribution of 1 before moving to a next layer. This increases a convergence speed to speed up the training process and train a separate layer independently from another layer.

A final layer of the LSTM auto-encoder model as a temporal distribution convolutional layer extracts an important visual feature from an output of the convolutional LSTM layer and outputs a video frame by using a sigmoid activation function.

A goal of the LSTM auto-encoder model is to capture an important change due to a motion (a motion of an object in a scene) which may help predict a visual frame by using given past and present frames.

The auto-encoder model trains a spatial feature capable of optimizing a decomposition of the input by using a predetermined type normalization, whereas the LSTM auto-encoder model is designed to have a decoder with fewer trainable parameters. The decoder may provide an immediate feedback to the encoder, but has no function to correct a mistake of the encoder as in a spatial case.

An error during the training process is mainly due to the encoder and may be constrained to generate a more informative feature map. A configurable parameter t represents a length of a time block. The architecture of the LSTM auto-encoder model is illustrated in FIG. 4.

The prediction unit 120 includes a first prediction unit and a second prediction unit.

The first prediction unit uses the trained auto-encoder model and the second prediction unit uses the LSTM auto-encoder model.

The first prediction unit is a means for reconstructing a restored batch by applying each input batch to which an inpainting pattern is applied to the trained auto-encoder model and combining the reconstructed restored batch to output the restored frame. An example of the inpainting pattern is illustrated in FIG. 5.

For example, it will be assumed that sample frames X1 and X2 are given, and it will be assumed that X1 is a normal frame and X2 is an abnormal frame.

According to an embodiment of the present disclosure, the auto-encoder model desires to reconfigure the input distribution for X1 and erroneously reconfigure the input distribution for X2. However, since a signal is trained to be restored through a training set during the training process of the auto-encoder model, other images including an abnormal type image is not prevented from being generated.

For example, an auto-encoder model trained to accurately reconstruct a pedestrian image is not trained not to accurately reconstruct a bicycle image. This indicates that the auto-encoder model may reduce training loss by accepting a compression strategy that works on different types of images.

As a result, the convolutional auto-encoder model is not guaranteed to represent a general image, which means that some query images may pass, resulting in a small reconfiguration error due to a bad signal. This is not limited to auto-encoder models, but applied to all generation models using neural networks.

Accordingly, according to an embodiment of the present disclosure, the first prediction unit may use the inpainting technique in the prediction process. That is, the first prediction unit may apply a plurality of inpainting patterns to the frame of the video and then apply the inpainting patterns to the trained auto-encoder model. The inpainting pattern is illustrated in FIG. 5. For example, each pixel value of the inpainting pattern may be set to zero (0).

The first prediction unit may construct an abnormal feature vector for the inpainting pattern by applying the frame to which the inpainting pattern is applied to the trained auto-encoder model. The abnormal feature vector may be expressed as in Equation 2.

$$\Gamma_{vs}[D(E(\Psi_{vs}(X)))-D(E(X))]^2 \qquad \text{[Equation 2]}$$

Here, $\Psi_{vs}$ denotes an operation for overwriting the inpainting pattern including zero (0) to the frame and $\Gamma_{vs}$ denotes an operation for overwriting except for the inpainting pattern including zero (0). Then, a non-zero area is simply concatenated as the frame feature.

Since the auto-encoder model may not use an input (X) as a clue for interpolation within the inpainting pattern, extrapolation should be performed within the inpainting pattern based on previous training. For example, when a bicycle is hidden by the inpainting pattern, the auto-encoder model may configure a general pedestrian adjusted in the scene and compare the generated pedestrian with the bicycle. As a result, the reconfiguration error between an input bicycle object and a pedestrian object increases.

The width of the inpainting pattern is a configurable parameter. FIG. 6 illustrates an experiment result by differentiating the width and the height of the inpainting pattern. According to an embodiment of the present disclosure, it can be seen that when the width of the inpainting pattern is 3, an optimized result is derived.

In other words, the first prediction unit according to an embodiment of the present disclosure may output the restored frame by applying the auto-encoder model trained by applying the inpainting pattern to the frame in the video.

The second prediction unit extracts and then restores a time domain feature point by applying a plurality of successive frames to the trained LSTM auto-encoder model to output time domain restored frames.

The LSTM auto-encoder model is the same as described with reference to the training process, and the plurality of successive frames applied to the LSTM auto-encoder model may be normal frames to which the inpainting pattern is not applied.

The abnormal object detection unit 125 derives the spatial domain reconstruction error by using the restored frame and the input frame, which are output results of the first prediction unit, and derives the time domain reconstruction error by using the time domain restored frames which are output results of the second prediction unit and input successive frames and then fuses the time domain reconstruction error to estimate an area where the abnormal object is positioned.

Since the spatial domain reconstruction error and the temporal domain reconstruction error are to measure a distance between an original frame and a prediction frame, respectively, the abnormal object detection unit 125 may determine an abnormality degree by training a support vector machine (SVM) as a feature extracted from a final fusion error. Here, the SVM may be a one-class SVM.

In an embodiment of the present disclosure, an average value of a distance of an error value of each pixel is calculated for training the SVM.

The fusion error is referred to as R, and a first classification feature for a frame having an m×n dimension is shown in Equation 3.

$$\|F1\| = \sqrt{\sum_{i=1}^{m}\sum_{j=1}^{n}|R_{ij}|^2} \quad \text{[Equation 3]}$$

Here, i and j represent pixels.

Since there is the first classification feature representing an abnormal intensity, a second classification feature may extract a position of an abnormal pixel in the frame. The number of indexes of the pixel may be selected and an average value of the values may be calculated and a threshold may be determined by using the calculated average value.

The threshold calculated as described above is used as the second classification feature for training learning the one-class SVM. The SVM is trained with a normal data feature and trained to form a hyperplane capable of separating a normal distribution from others. When an input feature is given into the SVM, the abnormality degree is calculated as a distance up to the separated hyperplane. A distance value is adjusted by max−min so that all scores are in the range of 0 to 1 through normalization. The memory 130 stores commands required to perform the method for detecting abnormal objects in the video according to an embodiment of the present disclosure.

The processor 135 is a means for controlling internal components (e.g., the preprocessing unit 110, the training unit 115, the prediction unit 120, the abnormal object detection unit 125, the memory 130, etc.) of the apparatus 100 for detecting abnormal objects in the video according to an embodiment of the present disclosure.

Figure 7:
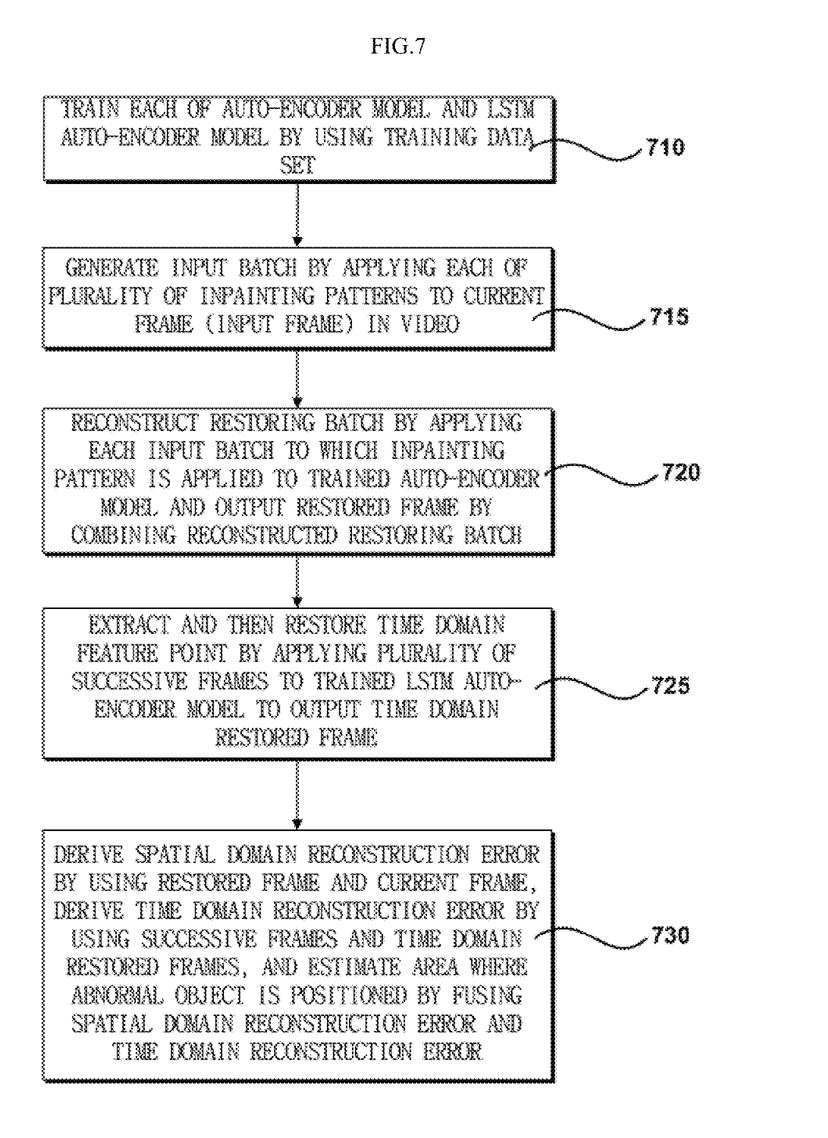
FIG. 7 is a flowchart illustrating a method for detecting abnormal objects in a video according to an embodiment of the present disclosure.
Figure 8:
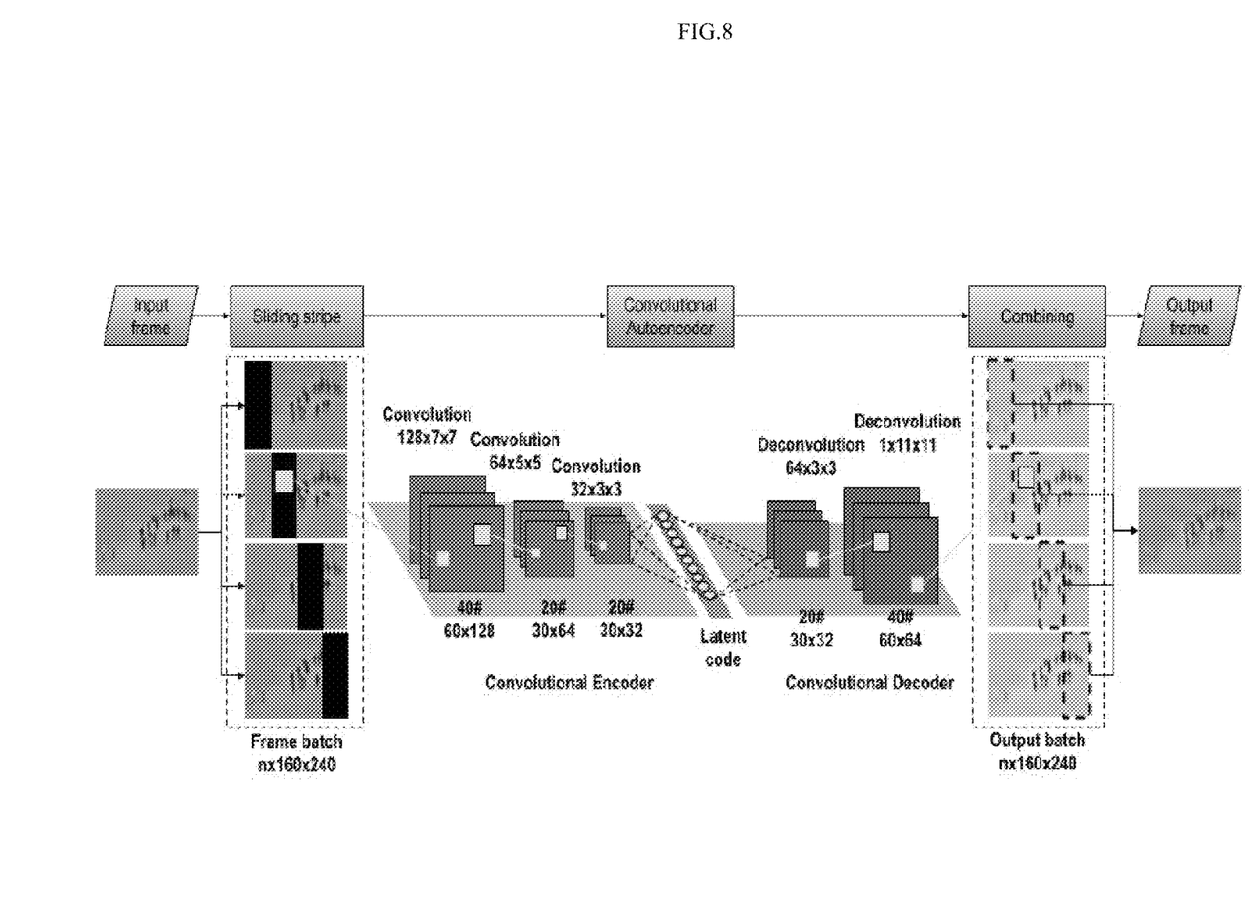
FIG. 8 is a diagram illustrating spatial domain reconstruction of an auto-encoder model adopting an inpainting technique according to an embodiment of the present disclosure.
Figure 9:
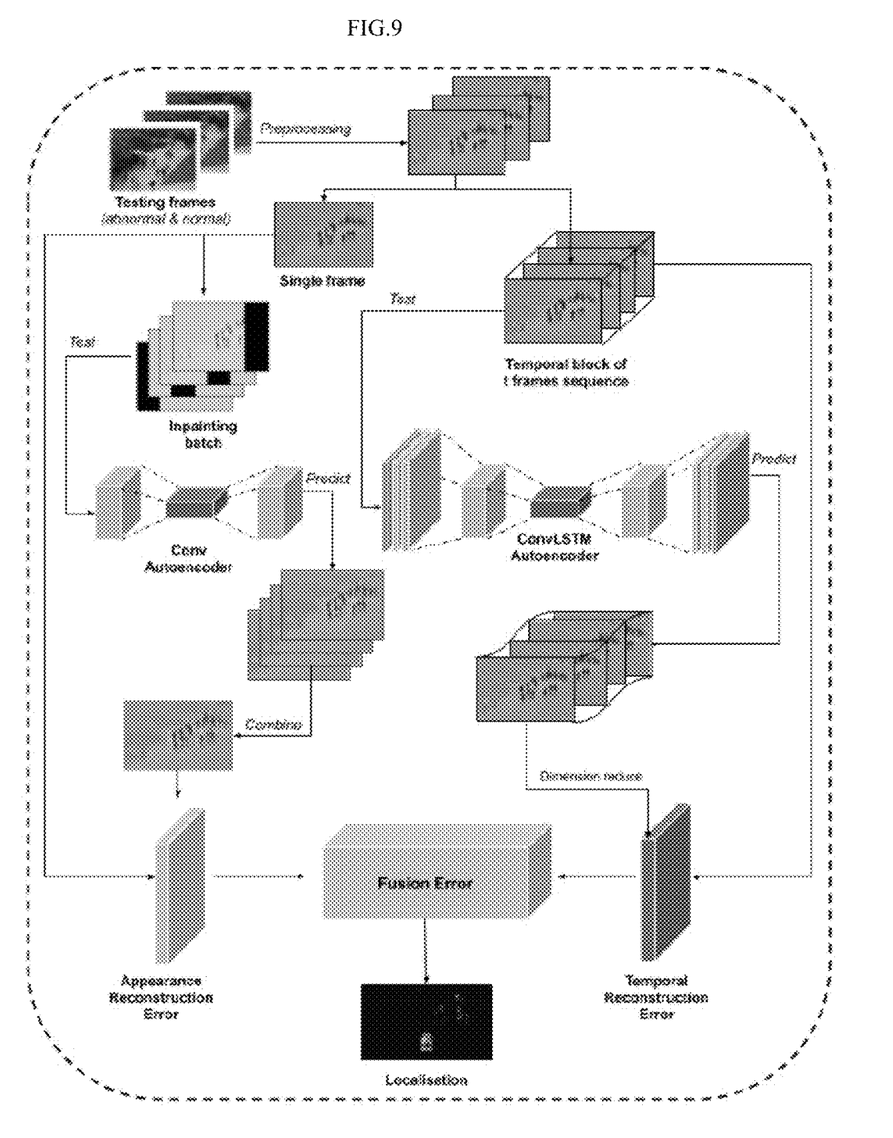
FIG. 9 is a diagram illustrating a detailed framework of an abnormal object detecting method according to an embodiment of the present disclosure.

FIG. 7 is a flowchart illustrating a method for detecting abnormal objects in a video according to an embodiment of the present disclosure, FIG. 8 is a diagram illustrating spatial domain reconstruction of an auto-encoder model adopting an inpainting technique according to an embodiment of the present disclosure, and FIG. 9 is a diagram illustrating a detailed framework of an abnormal object detecting method according to an embodiment of the present disclosure.

In step 710, an abnormal object detecting apparatus 100 trains each of an auto-encoder model and an LSTM auto-encoder model by using a training data set. Here, the auto-encoder model and the LSTM auto-encoder model may be a convolutional auto-encoder model and an auto-encoder model in which the convolutional LSTM is stacked.

The auto-encoder model and the LSTM auto-encoder model may be trained for normal frames (i.e., frames in which there is no abnormal object) as already described above. This is the same as that described with reference to FIG. 1, so a redundant description will be omitted.

In step 715, the abnormal object detecting apparatus 100 generates an input batch by applying each of a plurality of inpainting patterns to a current frame (input frame) in a video.

In step 720, the abnormal object detecting apparatus 100 applies each input batch to which the inpainting pattern is applied to the trained to reconstruct a restoring batch and combine the reconstructed restoring batch, thereby outputting a restored frame. A series of processes therefor is illustrated in more detail in FIG. 8.

In step 725, the abnormal object detecting apparatus 100 extracts and then restores a time domain feature point by applying a plurality of successive frames to the trained LSTM auto-encoder model to output time domain restored frames.

In step 730, the abnormal object detecting apparatus 100 derives a spatial domain reconstruction error by using the restored frame and the current frame, derives a time domain reconstruction error by using the successive frames and the time domain restored frame, and estimates an area whether an abnormal object is positioned by fusing the spatial domain reconstruction error and the time domain reconstruction error. As described above, a framework for a series of processes of generating the abnormal feature vector by applying the inpainting technique at the time of predicting the spatial domain to increase the reconstruction error and then, detecting the abnormal object by fusing with a time domain prediction result may be illustrated in more detail in FIG. 9.

The apparatus and the method according to embodiments of the present disclosure are implemented in a form of a program command which may be performed through various computer means and may be recorded in the computer readable medium. The computer readable medium may include singly a program command, a data file, or a data structure or a combination thereof. The program command recorded in the computer readable medium may be program instructions specially designed and configured for the present disclosure, or may be program instructions publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler.

The hardware device may be configured to be operated with one or more software modules in order to perform the operation of the present disclosure and vice versa.

The present disclosure has been described above with reference to the embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

What is claimed is:

1. An apparatus for detecting abnormal objects in a video, the apparatus comprising:
a batch unit generating an input batch by applying each of a plurality of inpainting patterns to a current frame of a video;

a first prediction unit reconstructing a restored batch by applying each input batch to which the inpainting pattern is applied to a trained auto-encoder model and combining the reconstructed restored batch to output a restored frame;

a second prediction unit extracting and then restoring a time domain feature point by applying a plurality of successive frames to an LSTM auto-encoder model to output time domain restored frames, wherein the plurality of successive frames are a plurality of successive frames including the current frame; and an abnormal object detection unit deriving a spatial domain reconstruction error by using the restored frame and the current frame, deriving a time domain reconstruction error by using the successive frames and the time domain restored frame, and estimating an area whether an abnormal object is positioned by fusing the spatial domain reconstruction error and the time domain reconstruction error.

2. The apparatus of claim 1, wherein the auto-encoder model is trained by using a normal frame to which the inpainting pattern is not applied.

3. The apparatus of claim 1, wherein the first prediction unit applies input batches to which the inpainting pattern is applied to the trained auto-encoder model to generate an abnormal feature vector for the inpainting pattern.

4. The apparatus of claim 3, wherein the abnormal object detection unit estimates an area in which the spatial domain reconstruction error is high as an area where the abnormal object exists at the time of fusing with the time domain reconstruction error as the spatial domain reconstruction error increases by the abnormal feature vector.

5. The apparatus of claim 1, wherein the inpainting patterns have different patterns including zero (0).

6. A method for detecting abnormal objects in a video, the method comprising:
   (a) generating an input batch by applying each of a plurality of inpainting patterns to a current frame of a video;
   (b) reconstructing a restored batch by applying each input batch to which the inpainting pattern is applied to a trained auto-encoder model and combining the reconstructed restored batch to output a restored frame;
   (c) extracting and then restoring a time domain feature point by applying a plurality of successive frames to an LSTM auto-encoder model to output time domain restored frames, wherein the plurality of successive frames are a plurality of successive frames including the current frame; and
   (d) deriving a spatial domain reconstruction error by using the restored frame and the current frame, deriving a time domain reconstruction error by using the successive frames and the time domain restored frame, and estimating an area whether an abnormal object is positioned by fusing the spatial domain reconstruction error and the time domain reconstruction error.

7. The method of claim 6, further comprising:
   before step (a),
   training the auto-encoder model by using a normal frame to which the inpainting pattern is applied; and
   training the LSTM auto-encoder by using the successive frames.

8. The method of claim 6, wherein in step (b), the input batches to which the inpainting pattern is applied are applied to the trained auto-encoder model to generate an abnormal feature vector for the inpainting pattern.

9. The method of claim 8, wherein in step (d), an area in which the spatial domain reconstruction error is high is estimated as an area where the abnormal object exists at the time of fusing with the time domain reconstruction error as the spatial domain reconstruction error increases by the abnormal feature vector.

10. A non-transitory computer readable recording medium product having a program code for performing the method by claim 6 recorded therein.

* * * * *